United States Patent [19]

Gaun et al.

[11] 4,266,465
[45] May 12, 1981

[54] PERCUSSION MECHANISM

[76] Inventors: Viktor A. Gaun, ulitsa Gogolya, 21a, kv. 14; Anatoly V. Belousov, prospekt K. Marxa, 55, kv. 56; Vadim D. Petukhov, ulitsa Kropotkina, 127, kv. 493; Gennady I. Suxov, ulitsa Sovetskaya, 47, kv. 22; Nikolai A. Belyaev, ulitsa Petukhova, 114, kv. 11; Vitaly K. Alyabiev, ulitsa Udarnaya, 29, kv. 105; Klimenty E. Rassomakhin, ulitsa B. Bogatkova, 163/8, kv. 100, all of Novosibirsk, U.S.S.R.

[21] Appl. No.: 54,307

[22] Filed: Jul. 2, 1979

Related U.S. Application Data

[62] Division of Ser. No. 811,836, Jun. 30, 1977, Pat. No. 4,194,435.

[30] Foreign Application Priority Data

Jul. 7, 1976 [SU] U.S.S.R. .............................. 2391708

[51] Int. Cl.$^3$ ............................................. F01L 21/02
[52] U.S. Cl. ........................................ 91/234; 91/25; 91/325; 91/468; 137/516.15; 137/860
[58] Field of Search ........................... 91/325, 234, 25; 137/516.5, 860

[56] References Cited

U.S. PATENT DOCUMENTS

| 1,414,224 | 4/1922 | Smith | 91/325 |
|---|---|---|---|
| 1,703,203 | 2/1929 | Officer | 91/325 |
| 1,931,041 | 10/1933 | Stevens | 91/325 |
| 2,121,364 | 6/1938 | Nagel | 91/325 |
| 2,703,558 | 3/1955 | Wilcox | 137/860 |
| 3,451,422 | 6/1969 | Chorkey | 137/860 |
| 4,088,062 | 5/1978 | Nilsson et al. | 91/325 |

FOREIGN PATENT DOCUMENTS 519535  8/1976  U.S.S.R. .................................. 91/325

*Primary Examiner*—Paul E. Maslousky
*Attorney, Agent, or Firm*—Lackenbach, Lilling & Siegel

[57] ABSTRACT

Fluid-actuated percussion mechanism includes a housing with an internal cylindrical space receiving a reciprocating piston dividing the space into a working stroke chamber and an idle stroke chamber. The mechanism further includes distributing means mounted in the housing and communicating the chambers and the source of the working fluid. The housing also accommodates a work-performing member adapted to receive impacts from the piston. The distribution means includes at the inlet of at least one of the chambers a valve made in the form of a resilient element. The surface of the distribution means has made therein valve seats of which the number corresponds to that of inlets for supplying the working fluid into the chamber. The resilient valve element is taut about the surface of the distribution means in opposition to the inlets and almost encircles the periphery of same, the resilient element defining by the internal surface thereof with the valve seat, and by the external surface thereof with the housing at least one inlet passage for supplying the working fluid to the inlets.

The disclosed structure of the valve, of the distribution means and of the housing enables to increase the total flow area of the passages through which the working fluid is supplied to the inlets of the chambers and thus to step up the power output of the percussion mechanism.

6 Claims, 14 Drawing Figures

PERCUSSION MECHANISM

This is a division of application Ser. No. 811,836, filed June 30, 1977 now U.S. Pat. No. 4,194,435.

FIELD OF THE INVENTION

The present invention relates to percussion mechanisms and, more particularly, it relates to percussion mechanisms actuated by a fluid under pressure, e.g. compressed air or compressed steam.

The invention can be utilized to utmost effectiveness in percussion mechanisms used in mining and like tools, e.g. in percussion drills submergible in a borehole, portable pneumatic drills, air hammers.

The invention can be also used in construction tools, e.g. in pneumatically actuated pile drivers, in self-propelled earth drills for driving underground holes, in concrete-breaking tools, etc.

Further, the present invention can be utilized for improving percussive tools used in machine-building, e.g. cutting and riveting tools, tamping tools, etc.

BACKGROUND OF THE INVENTION

Known in the art is a percussion mechanism which includes a housing with an internal space wherein there is received a reciprocable piston which divides this internal space into a working stroke chamber and an idle stroke chamber. The housing of the mechanism is made in the form of a series combination of a cylinder, a fluid-distribution unit and a connection for connecting the mechanism to a source of pressurized fluid. A socket is made in the cylinder at the side of the free end, which accommodates a work-performing member, and an exhaust port is made centrally of the cylinder. The working stroke chamber includes a counterbore made in the internal surface of the cylinder which is adjacent to the distribution unit.

The piston of the mechanism has a blind central bore wherein there is received a tube fixed in the distribution unit with aid of a coupling sleeve. The internal surface of the central bore of the piston has made therein an annular passage which communicates via an inclined passage with the idle stroke chamber. The bottom zone of this bore freely communicates via a lateral passage with the exterior of the piston, which engages the internal surface of the cylinder. The distribution unit, the tube and the coupling sleeve jointly define a valve space accommodating a valve member made in the form of an elastic bush having a seat-engaging shoulder on the internal side of the bush, this seat-engaging shoulder adjoining the base of the bush, facing the piston. The external lateral surface of the elastic bush and the internal lateral surface of the distribution unit define therebetween an annular inlet slot. This inlet slit communicates on one side thereof, through openings of the distribution unit, with the working stroke chamber of the mechanism, and on the other side communicates via the valve space and the lateral openings in the bush with a supply space defined within the bush. Also communicating with the supply space of the bush is the axial passage of the tube received in the piston.

Upon the abovedescribed pneumatic percussion mechanism having been connected via the connection member to a source of pressurized fluid, the fluid fills the supply space and from there flows via the lateral openings in the bush and the valve space, the inlet slit of the valve, the openings of the distribution unit, the working or forward stroke chamber and the exhaust port into the ambient atmosphere, while it flows via the tube, the annular passage and the inclined passage into the idle stroke chamber. Under the action of the pressure differential in the valve space and in the working stroke chamber, the elastic bush is spread to close the inlet slit.

The working fluid that has filled the working stroke chamber is withdrawn through the exhaust port into the ambient air, while the idle stroke chamber is being filled with the pressurized working fluid, whereby the piston is driven through the idle or return stroke. As the tube closes off the annular passage of the piston, the supply of the working fluid is cut off, and as the piston by its further motion clears the exhaust port, the fluid excapes through the exhaust port. By this time the lateral passage of the piston aligns with the annular counterbore of the cylinder, through which the pressurized working fluid enters the working stroke chamber from the central bore of the piston, filling this chamber. The pressure drop across the elastic bush, i.e. the difference between the pressures acting upon the external and internal lateral surfaces thereof, decreases and, when it falls to a predetermined value, the inherent resilience of the elastic bush contracts the bush, whereby the inlet slit becomes open. The pressure within the working stroke chamber becomes equal to that in the supply space. The piston first halts, and then is driven through a working stroke. When the internal surface of the cylinder closes off the lateral passage in the piston, the working stroke chamber remains in communication with the supply space exclusively via the valve. As the piston moves further on, it clears the exhaust port, and the pressure in the forward or working stroke chamber drops. The pressure differential expands the valve to close off the inlet slit, and the working fluid escapes from the working chamber. By this moment the tube opens the annular passage of the piston, and the pressurized working fluid fills the idle stroke chamber. Following an impact against the work-performing member, the piston is driven through an idle stroke.

A disadvantage of the abovedescribed pneumatic percussion mechanism having its valve made in the form of an elastic bush with an internal seat-engaging shoulder is that the valve defines with the distribution unit only one inlet slit. This hampers the feed of a substantial amount of the working fluid into the chamber of the mechanism, and thus affects the energy of the impact and the output capacity of the mechanism. If it is necessary to increase the pressure in other chambers of the mechanism, e.g. in the idle stroke chamber, it would require as many valves as there are chambers into which the pressurized fluid is to be additionally supplied. This would complicate the design of the mechanism and impair its reliability.

SUMMARY OF THE INVENTION

It is an object of the present invention to eliminate the abovementioned disadvantages of the hitherto known percussion mechanisms.

It is also an object of the present invention to increase the power output of a percussion mechanism, with a simultaneous reduction of the specific consumption of the pressurized working fluid.

It is another object of the present invention to simplify the structure of the percussion mechanism.

It is still another object of the present invention to enhance the reliability of the performance of the percussion mechanism.

It is yet another object of the present invention to provide a percussion mechanism with an increased flow passage area of its passages through which the pressurized fluid is fed into the chamber of the mechanism, without increasing the specific consumption of the pressurized fluid.

These and other objects are attained in a percussion mechanism actuated by a pressurized fluid, which comprises a housing with an internal cylindrical space wherein there is received an axially reciprocable piston which divides the internal space of the housing into a working stroke chamber of a variable volume and an idle stroke chamber of a variable volume. The chamber in the internal cylindrical space communicates through fluid distributing means and a distribution unit situated in the housing on the working stroke chamber side with a source of the pressurized fluid, at least one of these chambers having a valve disposed on the distribution unit through which the pressurized fluid is fed to effect reciprocation of the piston for the piston to deliver impacts upon a work-performing member accommodated in the housing. In accordance with the present invention with the valve includes a resilient annular valve element, valve seats being made on the surface of the distribution unit, their number equalling that of the inlet openings for supplying the fluid into the chambers, the annular resilient valve element being taut about the distribution unit in opposition to the said inlet openings and encircling the distribution unit about its periphery. The internal surface of the resilient element with the seat and its external surface with the housing each defines at least one inlet passage for supplying the fluid to the said inlets.

The abovespecified structure of the valve of the distribution unit and of the housing provides a passage for supplying the fluid to the said inlets at both end faces of the valve, and thus increases the total flow area of these passages.

It is preferable that the inlet passages for supplying the pressurized fluid to the inlets of the seats and of the distribution unit should be made in the form of longitudinal recesses in the surface of the distribution unit. This enables the resilient element of the valve to move circumferentially relative to the inlets in the course of the service of the mechanism and enhances the reliability of the mechanism.

In case of percussion mechanisms designed for relatively short service periods, it is preferable that the inlet passages for supplying the pressurized fluid to the inlets of the seat and of the distribution unit should be made in the form of longitudinal recesses or grooves made in the internal surface of the resilient element, in areas facing the inlets. In this way the construction of the distribution unit and of the percussion mechanism, as a whole, can be simplified.

In percussion mechanisms in which the resilient valve element is of a structure permitting mere bonding of the element, it is preferable that the inlets for supplying the pressurized fluid into the chamber should be arranged in diametral opposition to each other. When the valve is used for supplying the fluid into the working stroke chamber and into the idle stroke chamber, it is expedient that the respective axes of each pair of said inlets should be perpendicular. In this way the stability of the operating motion of the valve is enhanced, as is the reliability of its performance.

In percussion mechanisms in which the distribution unit supporting the resilient valve element has additional passages for supplying the pressurized fluid into the chambers of the mechanism, it is preferable that the resilient valve element should be made in the form of an open ring having its ends fixed to the valve seat. This feature simplifies the construction of the percussion mechanism and increases its reliability.

It is also preferable that the external or peripheral surface of the resilient element should be of an increased thickness in areas opposing the inlets of the seat, to prevent excessive pressing-in of the resilient valve element and thus to enhance its durability.

It is further preferable that the external surface of the resilient valve element should have, in areas facing the inlets of the distribution unit, recesses or grooves shaped like these inlets, but being slightly larger than the inlets. This feature saves the resilient valve element from being damaged by the edges of these inlets and thus increases its useful life.

It is likewise preferable that the surface of the distribution unit should have abutment means or lugs adapted to accommodate the resilient valve element therebetween, to preclude longitudinal displacement of the element and thus to increase the reliability of its performance.

It is preferable that in percussion mechanisms wherein the resilient valve element is of a structure defining its substantially bending deformation, the resilient element should be taut about detachable fastening means mounted on the distribution unit. In this case these fastening means can be made of a material with a relatively high viscous or internal friction, so as to dampen high-frequency oscillation of the resilient valve element in operation and thus to enhance its reliability.

In some percussion mechanisms it may be preferable that the distribution unit receiving thereabout the resilient valve element should have a cylindrical bore and should be mounted so that the internal surface of this bore should present a continuation of the internal cylindrical space of the housing. This feature reduces the overall length of the percussion mechanism and simplifies its structure.

BRIEF DESCRIPTION OF THE DRAWINGS

The invention will be further described in connection with its preferred embodiments, with reference being had to the accompanying drawings, wherein.

DETAILED DESCRIPTION OF THE INVENTION

Figure 1:
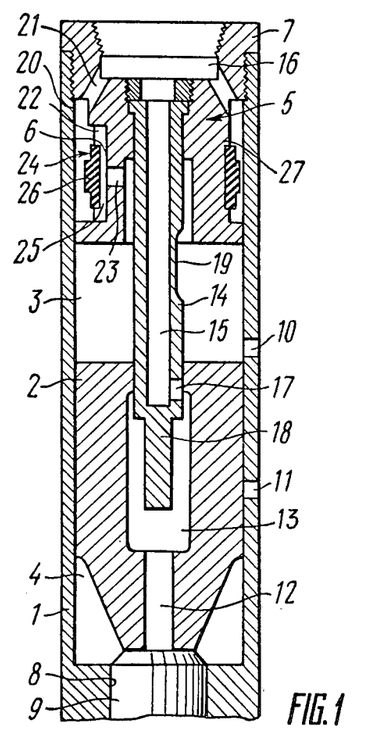
FIG. 1 is a longitudinal cross sectional view of a percussion mechanism embodying the invention, wherein the valve is adapted to supply the working fluid into the working stroke chamber.

A deep-hole pneumatic drill for drilling blast holes can incorporate a percussion mechanism constructed in accordance with the present invention and illustrated in FIG. 1, which increases the power output of the drill.

The hollow housing 1 (FIG. 1) of the mechanism receives thereinside a reciprocating piston 2 which divides the internal space of the housing 1 into a working stroke chamber 3 and an idle stroke chamber 4. The housing 1 is provided with a distribution unit 5 with a valve seat 6 provided thereon and also with a connection means 7 for connection of the mechanism to a source of a pressurized working fluid (the source not being shown in the drawings). Adjacent to its free end, the housing 1 has a socket 8 which accommodates a work-performing member 9. Made in the central portion of the housing 1 are through-going exhaust ports 10 and 11 for withdrawal of the working fluid from the aforementioned chambers 3 and 4 of the mechanism. The piston 2 is provided with a through axial bore 12 which in its central part widens into a space 13. This axial bore 12 of the piston 2 receives a distributing rod 14 fixed in the distribution unit 5 and having a blind axial bore 15 opening at one of its end into a supply space 16 defined within the distribution unit 5 and having its blind end communicating via a radial opening 17 with the internal space 13 of the piston 2. The free end of the distributing rod 14 is provided with a stem 18 adapted to close the bore 12 of the piston 2. In the central part of the distributing rod 14 there is made an external passage 19 in the form of a groove, for establishing communication between the working stroke chamber 3 and the space 13, when the piston 2 is most remote from the work-performing member 9. Defined between the housing 1 and the distribution unit 5 is a valve space 20 communicating via a lateral passage 21 with the supply space 16. Made in the side surface of the distribution unit 5 are longitudinal recesses 22 including inlets 23 opening into the working stroke chamber 3. Received about the side surface of the distribution unit 5, in opposition to these inlets 23, is a taut resilient annular valve element 24 defining with these recesses 22 inlet passages 25 whose ends opened into the valve space 20 and whose central part opens into the inlets 23. The provision of the inlet passages 25 at both end faces of the resilient valve element 24 increases the total flow area of the valve. The external surface of the resilient valve element 24 has in areas opposing the inlets 23 thickened portions 26 adapted to prevent excessive pressing-in of the resilient element 24 into the inlets 23 in operation. To preclude longitudinal displacement of the resilient valve element 24, lugs 27 are provided on the surface of the distribution unit 5. The valve element can be made of commonly available grades of oil-proof rubber.

Figure 2:
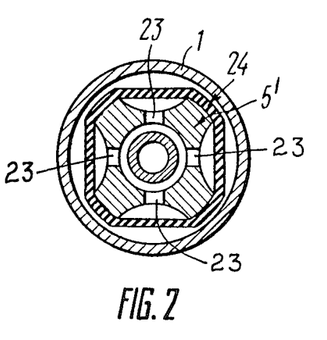
FIG. 2 is a cross-sectional view across the inlet of the chamber of an embodiment of the valve having several inlets.

In another preferred embodiment of the invention, the distribution unit 5' (FIG. 2) has several inlets 23 arranged, preferably, in diamteral opposition to one another, as it is shown in FIG. 2. This increases the stability of the operation-wise motion of the resilient valve element 24.

Figure 3:
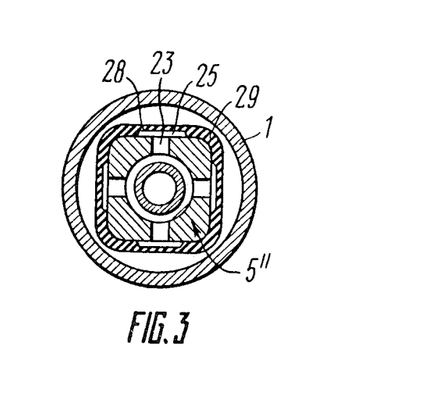
FIG. 3 is a cross-sectional view across the inlet of the chamber of another embodiment of the percussion mechanism wherein the inlet passages are defined by longitudinal recesses in the internal surface of the resilient valve element.

Percussion mechanisms embodying the present invention and designed for relatively short service periods, preferably have their inlet passages 25 (FIG. 3), for supplying the pressurized fluid to the inlets 23 of the distribution unit 5'', include longitudinal recesses 28 in the internal surface of the resilient valve element 29 in the areas facing the inlets 23. This simplifies the construction of the distribution unit 5'' and of the percussion mechanism, as a whole. In this case the resilient element 29 is retained against displacement relative to the distribution unit 5''.

When the percussion mechanism is connected via the connection 7 (FIG. 1) to the source of pressurized fluid, the fluid fills the supply space 16 and flows therefrom via the lateral passage 21, the valve space 20, the inlet passages 25, the inlets 23, the working stroke chamber 3 and the exhaust port 10 into the ambient air and via the axial bore 15, the radial opening 17 and the space 13 into the bore 12. Owing to the pressure drop between the valve space 20 and the working stroke chamber 3, the portions of the resilient valve element 24, opposing the inlets 23, are deformed to close the inlet passages 25. Therefore, the supply of the pressurized fluid into the working stroke chamber 3 is cut off, while the working fluid that has found its way into the working stroke chamber 3 excapes via the port 10. By this time the pressurized fluid has found its way from the bore 12 of the piston 2 through gaps between the piston 2 and the work-performing member 9 into the idle stroke chamber 4 and has filled it. The piston 2 is thus driven off the work-performing member 9, and the axial bore 12 thereof becomes fully open. The pressure in the idle stroke chamber 4 is rapidly built up, and the piston 2 is driven through its idle stroke. Upon the stem 18 closing the bore 12, the supply of the working fluid into the idle stroke chamber 4 is cut off, and the further motion of the piston 2 makes the piston 2 clear the exhaust port 11, whereby the working fluid is withdrawn into the ambient air. As the piston 2 moves further on, its internal space 13 becomes connected via the external passage 19 to the working stroke chamber 3, whereby the working fluid fills the working stroke chamber 3. The pressure differential between the valve space 20 and the working stroke chamber 3 decreases, and, when it falls to a predetermined value, the portions of the resilient valve element 24, which have been pressed against the inlets 23, straighten up by their own inherent resilience, whereby the inlet passages 25 become open. The pressure in the working stroke chamber 3 rapidly increases to that in the supply space 16, whereby the piston 2 is first halted, and then driven through a working stroke. When the external passage 19 clears the internal space 13 of the piston 2, the working stroke chamber 3 remains in communication with the supply space 16. The great flow area of the inlet passages 25 providing for a high working pressure in the working stroke chamber 3. Upon the closure stem 18 having left the bore 12, the working fluid begins filling the idle stroke chamber 4, and practically at the same moment the piston 2 begins to open the exhaust port 10. The flow rate of the working fluid through the inlet passages 25 increases to a critical value, the condition of the resilient valve element 24 becomes unstable, and the ensuing slight drop of the pressure in the working stroke chamber 3 result in an abrupt increase of the pressure differential between the valve space 20 and the working stroke chamber 3. This can be explained by the fact that by this moment the inflow of the working fluid into the valve space 20 becomes higher than the flow rate of the fluid through the inlet passages 25, whereby the pressure within the valve space 20 becomes equal to that in the supply space 16. The small mass of the resilient valve element 24 and the relatively great area of this element 24, acted upon by the said pressure differential, are responsible for the resilient valve element 24 rapidly closing off the inlet passages 25. The working fluid then escapes through the exhaust port 10 and the piston 2 delivers an impact upon the work-performing member 9 and thereafter is driven through an idle stroke.

Then the piston 2 is repeatedly driven through cycles similar to the abovedescribed one.

Figure 4:
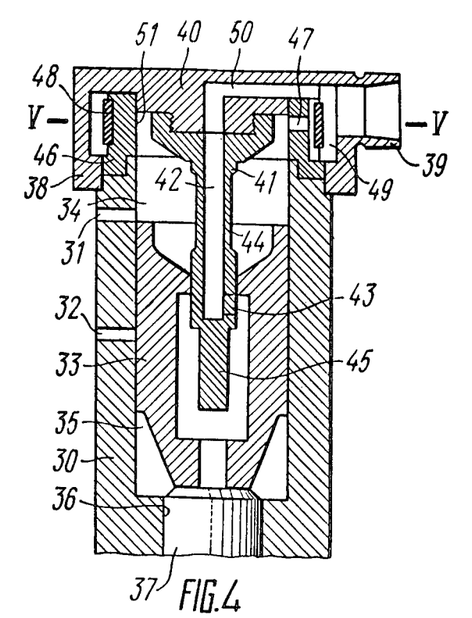
FIG. 4 is a longitudinal cross sectional view of a percussion mechanism wherein the surface of the cylindrical bore of the distribution unit is a continuation of the surface of the internal cylindrical space of the housing.
Figure 5:
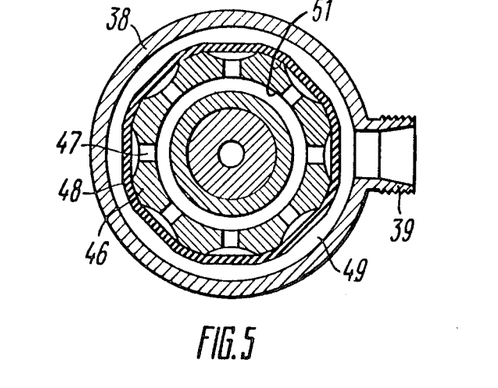
FIG. 5 is a cross sectional view taken along the line V—V of FIG. 4.

The present invention is also embodied in the percussion mechanism illustrated in FIGS. 4 and 5 of the drawings. This embodiment is particularly suitable for incorporation is pneumatic concrete breakers and pick hammers.

The internal space of the housing 30 (FIG. 4) having exhaust ports 31, 32 receives therein a reciprocating piston 33 which divides this space into a working stroke chamber 34 and an idle stroke chamber 35.

The housing 30 is provided adjacent to the idle stroke chamber 35 with a socket 36 accommodating a work performing member 37, and the end of the housing 30 adjacent to the working stroke chamber 34 is closed with a lid 38 (FIGS. 4 and 5), which is provided with a connection 39 for connecting the mechanism to a source (not shown) of the a working fluid under pressure. On the face thereof, adjacent to the working stroke chamber 34 (FIG. 4), the lid 38 is provided with a cylindrical lug 40 supporting thereon a distributing rod 41 having an axial bore (a groove) 42, a radial opening 43, an external passage 44 and a stem 45.

Received between the housing 30 and the lid 38 is a distribution unit 46 having stretched thereabout, in opposition to inlets 47, an annular resilient valve element 48, e.g. made of rubber (see FIG. 5). The distribution unit 46 defines with the lid 38 a distribution or supply space 49 communicating via a passage 50 provided in the lid 38 with the axial bore 42 of the distributing rod 41, the supply space also communicating with the connection 39.

The cylindrical bore 51 of the distribution unit 46 has a diameter slightly greater than that of the piston 33, whereby the piston partly enters the distribution unit 46 at the end of its idle stroke. In some modifications it may be found structurally advisable to have the distribution unit 46 integral with the housing 30.

The above described general layout of the percussion mechanism enables a reduction in its overall length and simplification of its construction.

The operation of the percussion mechanism described hereinabove is similar to that of the mechanism illustrated in and described in connection with FIG. 1, and, therefore, it will not be separately described.

Figure 6:
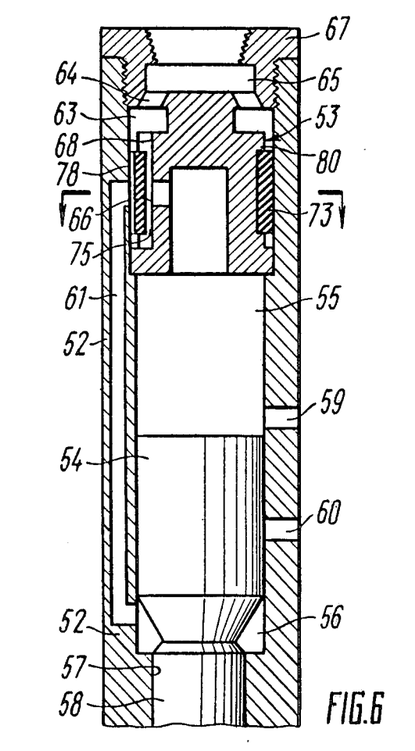
FIG. 6 is a longitudinal cross sectional view of a percussion mechanism wherein the resilient valve element is adapted to control the supply of the pressurized fluid into the working stroke chamber and into the idle stroke chamber.

In applications requiring a relatively long piston stroke and limited consumption of the pressurized working fluid, it may be found preferable to use the embodiment of the percussion mechanism illustrated in FIG. 6.

The hollow housing 52 (FIG. 6) of this mechanism supports therein a distribution unit 53 and receives a reciprocating piston 54 dividing the internal space of the housing 52 into a working stroke chamber 55 and an idle stroke chamber 56. The housing 52 is provided with a socket 57 accommodating a work-performing member 58 and has exhaust ports 59 and 60. The housing 52 may have made in the wall thereof either two side passages 61, 62 (FIG. 7), for supplying the working fluid into the idle stroke chamber 56, or a single passage 61 (FIG. 6). Defined between the housing 52 and the distribution unit 55 is a valve space 63 communicating via openings 64 with a supply space 65. The distribution unit 55 is provided with valve seats 66 and a connection 67 for connecting the percussion mechanism to a source (not shown) of the pressurized working fluid. Made in the side surface of the distribution unit 53 of the presently described embodiment is either a single longitudinal recess 68 or several such recesses 68, 69, 70 (FIG. 7), the depth of the recess 68 being somewhat smaller than that of the recesses 69. The recesses 68 and 69 have opening thereinto inlets 71 for supplying the pressurized working fluid into the working stroke chamber 55 (FIG. 6), whereas the recess 70 (FIGS. 7 and 8) has no such inlet. The internal surface of the housing 52 has made therein a longitudinal recess 72 communicating with the side passage 62. Received about the side surface of the distribution unit 53, in opposition to the inlet of the passage 61 and to the inlet or inlets leading into the chamber 55, is a taut annular resilient valve element 73 (FIG. 6) or an element 74 (FIGS. 7 and 8) defining with the respective inlets either an inlet passage 75 (FIG. 6) or a plurality of such passages 75, 76, 77 (FIG. 7) opening at both ends thereof into the valve space 63. Another inlet passage 78 is defined by the longitudinal recess or groove made in the external surface of the resilient element, respectively, 73 (FIG. 6) or 74 (FIG. 7), in opposition to the inlet of the passage 61. To protect the resilient valve element 74 from being forced into the inlet of the passage 62, the resilient element 74 has made therein a recess 79 having at the inlet thereof a shape similar to that of the inlet of the passage 62, although of a somewhat greater size. The resilient element 73 (FIG. 6) is retained against longitudinal displacement by projections 80 provided on the distribution unit 53.

The material of the resilient valve element 73 or 74 (FIGS. 7, 8) of the presently described embodiment can be any common grade or oil-proof rubber.

Figure 7:
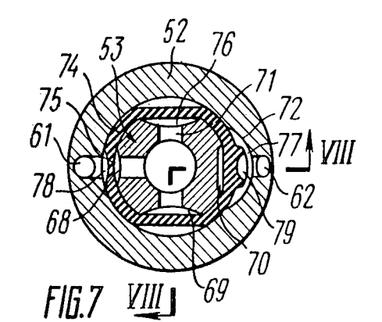
FIG. 7 is a cross-sectional view across the inlet of the chamber in an embodiment with two side passages.
Figure 8:
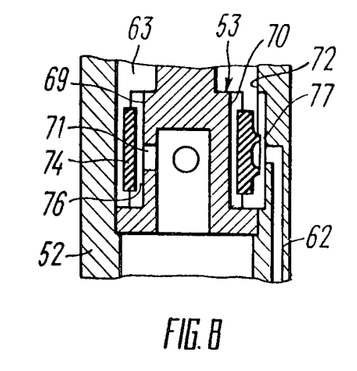
FIG. 8 is a cross sectional view taken along the line VIII—VIII of FIG. 7.

As the presently described percussion mechanism is connected via the connection 67 (FIG. 6) to a source of the pressurized working fluid, the fluid flows via the supply space 65 and the openings 64 into the valve space 63, wherefrom it flows via the inlet passage 75 into the working stroke chamber 55 and escapes via the exhaust port 59 into the ambient atmosphere, the working fluid also flows either via the inlet passage 78 and the side passage 61, or via the inlet passages 77, 78 and the side passages 61, 62 (FIG. 7), into the idle stroke chamber 56 (FIG. 6). Owing to the pressure differential between the valve space 63 and the working stroke chamber 55, the portion of the resilient valve element 73, opposing the inlet 71, is deformed to close the inlet passage 75, the flow area of the inlet passage 78 increasing. The modification of the present embodiment, having the distribution unit 53 with the side passages 61, 62 and the resilient element 74, as illustrated in FIGS. 7 and 8, operates in a manner similar to that being described hereinbelow for the operation of the mechanism illustrated in FIG. 6. The pressure of the working fluid in the idle stroke chamber 56 drives the piston 54 through an idle stroke. The idle stroke chamber 56 remains communicated with the valve space 63 via the inlet passage 78, whereby the pressure in this chamber 56 rapidly drops. Meanwhile, the pressure in the working stroke chamber 55 increases, owing to the working fluid being compressed therein. When the pressure differential between the working stroke chamber 55 and the inlet passage 78 attains a predetermined value, the portion of the resilient valve element 73, defining the last-mentioned passage, is displaced toward the inlet of the side passage 61, closing the passage 61 and simultaneously opening the inlet passage 75 through which the pressurized working fluid begins to flow into the working stroke chamber 55. The supply of the pressurized working fluid into the idle stroke chamber 56 is thus discontinued, and eventually the working fluid is withdrawn from the idle stroke chamber 56 into the ambient atmosphere.

Meanwhile, the pressure in the working stroke chamber 55 is increasing, whereas the pressure differential between the valve space 63 and the last-mentioned chamber 55 is descreasing.

Upon the said pressure differential falling to a predetermined value, the portions of the resilient valve element 73, pressed against the recesses 69 (FIG. 7), straighten up by their inherent resilience and thus open the inlet passages 76. The pressure in the working stroke chamber 55 (FIG. 6) rapidly increases. The piston 54 is first halted, and then driven through a working stroke. At the initial moment of opening by the piston 54 of the exhaust ports 59 the rate of flow of the working fluid through the inlet passages 76 attains a critical value, which results in these passages being swiftly closed. The working stroke chamber 55 remains in communication with the valve space 63 via the inlet passage 75, and the pressure in this chamber rapidly drops. In the meantime, the pressure in the idle stroke chamber 56 increases, owing to the working fluid therein being compressed by the moving piston 54, whereby the portion of the resilient valve element 73, opposing the longitudinal recess 68, is displaced to close the passage 75 and to open the inlet passage 78. The pressure in the idle stroke chamber 56 rapidly increases. The piston delivers an impact upon the work-performing member, and thereafter is driven through an idle stroke.

Then the piston is driven repeatedly through cycles similar to that described hereinabove.

A specific attractive feature of the operation of the modification of the presently described embodiment of the invention, illustrated in FIG. 7, is that one portion of the resilient valve element 74, viz. the portion defining the inlet passages 75 and 78 which have relatively small flow areas, controls the operation of other portions of this resilient valve element 74, defining the inlet passages 76 of substantially greater flow areas or cross-sections. This enables an increase in the power output of the percussion mechanism with a moderate consumption of the working fluid.

Figure 9:
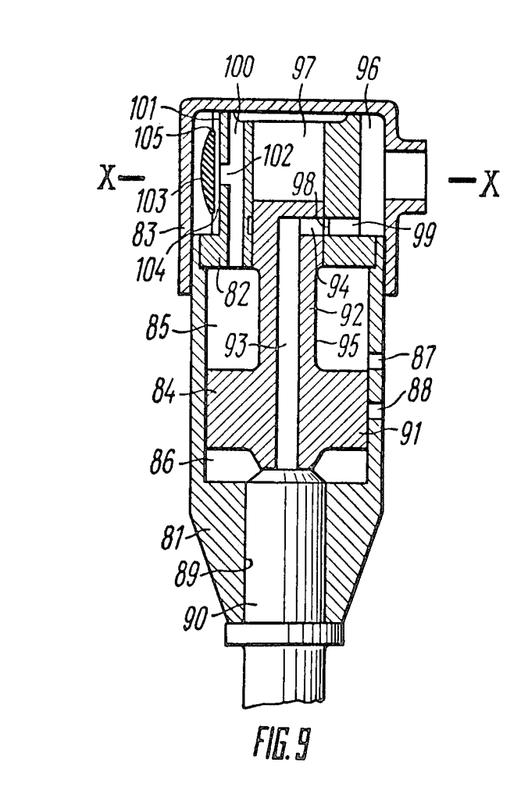
FIG. 9 is a longitudinal cross sectional view of a percussion mechanism wherein the resilient valve element is in the form of an open ring.

Another embodiment of the present invention is illustrated in FIG. 9 of the drawings. The general layout of this modification is particularly suitable for incorporation in hand-operated pneumatic percussion tools, e.g. concrete breakers.

The hollow housing 81 has mounted therein a distribution unit 82 and is closed with a lid 83, the housing 81 receiving therein a reciprocating piston 84 which divides the internal space of the housing 81 into a working stroke chamber 85 and an idle stroke chamber 86. The housing 81 has made therethrough exhaust ports 87, 88 for withdrawal of the working fluid from the chambers and has a socket 89 accommodating a work-performing member 90. The piston 84 has a head 91 and a tail 92 and is provided with a blind axial bore 93 opening to the side surface of the tail 92 via a radial passage 94 and serving to supply the working fluid into the idle stroke chamber 86. The tail 92 of the piston 84 has made in the surface thereof an external passage (a groove) 95 for supplying the pressurized working fluid into the working stroke chamber 85 when the piston 84 is at its most remote point from the work-performing member 90. The lid 83 is provided with a connection for connecting the mechanism to a source (not shown) of the pressurized working fluid and defines with the distribution unit 82 a supply space 96. The distribution unit 82 has a central bore 97 adapted to receive the tail 92 of the piston 84. The internal wall of this bore includes an annular counterbore 98 opened into the supply space 96 via a passage 99. The central bore 97 of the distribution unit 82 and the working stroke chamber 85 are interconnected with a longitudinal passage 100.

Figure 10:
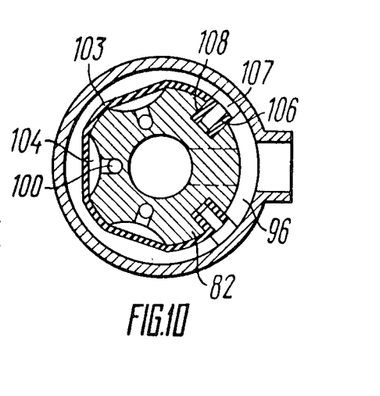
FIG. 10 is a cross sectional view taken along the line X—X of FIG. 9.
Figure 11:
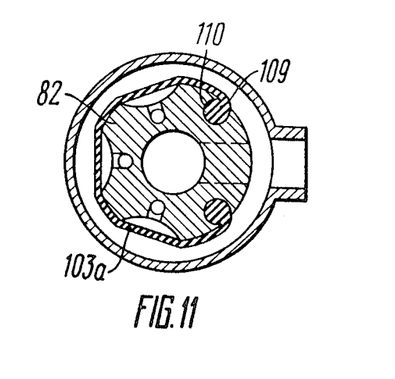
FIG. 11 is a cross sectional view across the inlet of the chamber of another embodiment of the percussion mechanism.

The external side surface of the distribution unit 82 is provided with a plurality of valve seats in the form of longitudinal recesses 101 including inlets 102 opening into the longitudinal passages 100. Received about the external side surface of the distribution unit 82 is a resilient valve element 103 stretched tight and being made in the form of an open or split ring having its ends fixed in the distribution unit 82. The material of the resilient valve element 103 may be any suitable common grade of oil-proof rubber. The resilient valve element 103 defines with the longitudinal recesses 101 inlet passages 104. This resilient element 103 is retained against longitudinal displacement by lugs 105. The means fastening the ends of the resilient valve element 103 include plugs 106 (FIG. 10) provided on these ends of the resilient element 103 and received, in association with expanding pins 107, in holes 108 provided for the purpose in the body of the distribution unit 82. Another modification of the means fastening the resilient element 103 is illustrated in FIG. 11, the resilient valve element 103 of this modification having lugs 109 receivable in longitudinal grooves 110 in the body of the distribution unit 82.

Upon the percussion mechanism of the presently described embodiment being connected to a source of the pressurized working fluid, the fluid flows into the supply space 96 (FIG. 9), to flow therefrom via the inlet passages 104, inlets 102, longitudinal passages 100, the working stroke chamber 85 and the exhaust port 87 into the ambient atmosphere, and to flow via the passage 99, the annular counterbore 98 and the radial passage 94 into the axial bore 93. Owing to the pressure differential between the supply space 96 and the working stroke chamber 85, the portions of the resilient valve element 103, disposed in opposition to the inlets 102, are deformed to close the inlet passages 104. Thereby the supply of the working fluid into the working stroke chamber 85 is cut off, while the working fluid that has already flown into the last-mentioned chamber is withdrawn into the ambient atmosphere through the exhaust port 87. Under the action of the pressurized working fluid in the axial bore 93, the piston 84 is driven off the work-performing member 90, whereby this bore 93 completely opens to supply the working fluid into the idle stroke chamber 86. The piston is driven through an idle stroke. Upon the tail 92 of the piston 84 closing off the counterbore 98, the supply of the working fluid into the chamber 86 is discontinued, and as the piston 84 moves further on, its head 91 clears the exhaust port 88, whereby the working fluid is withdrawn from the idle stroke chamber 86 into the ambient atmosphere. When the external passage 95 aligns with the annular counterbore 98, the working fluid is supplied into the working stroke chamber 85 and into the central bore 97. The pressure differential between the supply space 96 and the working stroke chamber 85 decreases, and the portions of the resilient valve element 103, opposing the inlets 102, straighten up by their own inherent resilience, to open the inlet passages 104. The pressure in the working stroke chamber 85 and in the central bore 97 rapidly increases. The piston 84 is first halted, and then is driven through a working stroke. Upon the external passage 95 clearing the counterbore 98, the working stroke chamber 85 and the central bore 97 remain in communication with the supply space 96 only through the valve. At the initial moment of the opening of the exhaust port 87 by the head 91 of the piston 84, the rate of flow of the working fluid through the inlet passages attains a critical value, and the ensuring slight displacement of the piston 84 results in a rapid increase of the pressure differential acting upon the resilient valve element 103, whereby the resilient valve element 103 swiftly closes the inlet passages 104. The supply of the working fluid into the working stroke chamber 85 and into the central bore 97 is thus discontinued, and the working fluid is withdrawn through the exhaust port 87. With the radial passage 94 aligning with the annular counterbore 98, the working fluid is supplied into the idle stroke chamber 86. Following an impact against the work-performing member 90, the piston 84 is driven through an idle stroke, whereafter the abovedescribed cycle is repeated.

Figure 12:
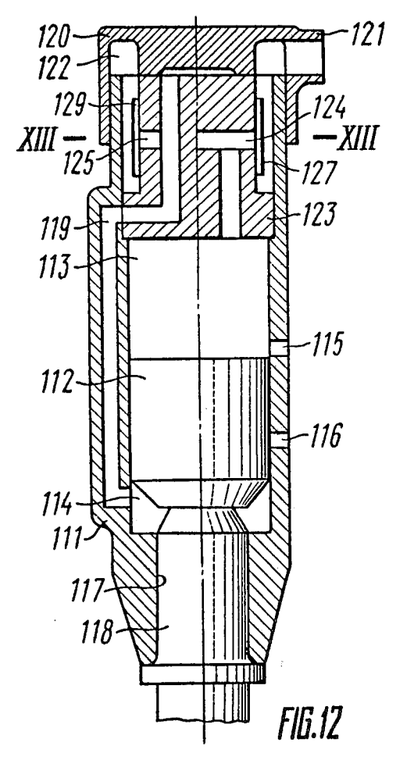
FIG. 12 is a cross sectional longitudinal view of a percussion mechanism wherein the inlets of the distribution unit, adapted to supply the working fluid into one of the chambers of the mechanism, are arranged in opposition to one another, this view having been taken along the line XII—XII of FIG. 13.

Still another embodiment of the present invention is illustrated in FIG. 12 of the drawing. This general layout of a percussion mechanism is particularly suitable for incorporation in metalcutting and riveting hammers.

The hollow housing 111 (FIG. 12) of the mechanism receives therein a reciprocating piston 112 which divides the internal space of the housing 111 into a working stroke chamber 113 and an idle stroke chamber 114. The housing 111 has made through its wall exhaust ports 115, 116 for withdrawal of the working fluid from the said chambers and has a socket 117 adapted for accommodation of a work-performing member 118.

Figure 13:
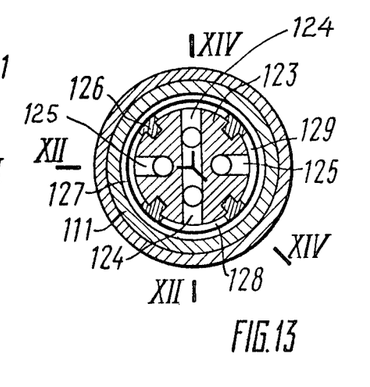
FIG. 13 is a cross sectional view taken on line XIII—XIII of FIG. 12.
Figure 14:
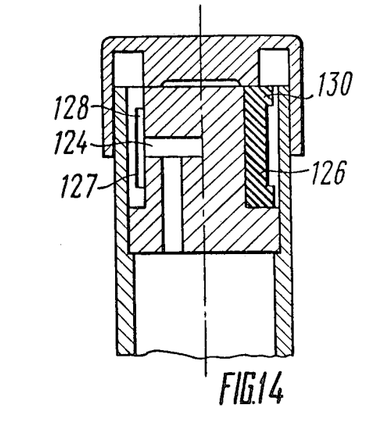
FIG. 14 is a cross sectional view taken along the line XIV—XIV of FIG. 13.

The housing 111 has made therein side passages 119 for supplying the pressurized working fluid into the idle stroke chamber 114. The end of the housing 111, adjoining the working-stroke chamber 113, is closed with a lid 120 incorporating a connection 121 for connecting the percussion mechanism with a source (not shown) of the pressurized working fluid. The housing 111 has mounted therein a distribution unit 123 with inlets 124, 125. Two inlets 124 are arranged in opposition to each other and open into the working stroke chamber 113, and the other two inlets 125, are arranged in opposition to each other and open into the side passages 119, the respective axes of the inlets 124 and 125 being perpendicular (see FIG. 13). Mounted externally of the distribution unit 123 on removable fastening means 126 (FIG. 13) is an annular resilient valve element 127 defining with the distribution unit 123 inlet passages 128 and 129. The fastening means 126 has lugs 130 (FIG. 14) retaining the resilient valve element 127 against longitudinal displacement. In some modifications of the percussion mechanism it may be preferable to have the removable fastening means in the form of rolling bodies. The material of the valve element of the presently described embodiment may be spring steel, some grades of bronze or tough plastic (e.g., "Kapralon"). To enhance reliability, the exterior of the valve element is preferably coated with an elastic material, e.g. rubber.

When the percussion mechanism is connected via the connection 121 (FIG. 12) with a source of the pressurized working fluid, the fluid flows into the supply space 122 and therefrom through the inlet passages 128, inlets 124, working stroke chamber 113 and exhaust port 115 into the ambient atmosphere, and flows via the inlet passages 129, inlets 125 and side passages 119 into the idle stroke chamber 114. Under the action of the pressure differential, the portions of the resilient valve element 127 (FIG. 13), opposing the inlets 124, are deformed and pressed tight against these inlets. With the inlets 124 being arranged in diametral opposition to each other, and the material of the valve element being relatively rigid, this deformation results in the shape of the resilient element 127 becoming elliptical.

The portions of the resilient valve element 127, opposing the other pair of inlets 125, are thus displaced toward the housing 111, whereby the flow area of the inlet passages 129 increases. Under the influence of the pressure in the idle stroke chamber 114 (FIG. 12), the piston 112 is driven through an idle stroke. At the initial moment of the opening of the exhaust port 116 by the piston 112, the flow rate of the working fluid through the inlet passages 129 attains the critical value, and the ensuing slight displacement of the piston 112 results in an abrupt increase of the pressure differential acting upon the portions of the resilient valve element 127, opposing the inlets 125 (FIG. 13), whereby these portions of the resilient valve element 127 are deformed and pressed tight against the inlets 125. Meanwhile, the portions of the resilient valve element 127, which have been pressed against the inlets 124, clear these inlets 124 by the action of the inherent resilience of the element 127 and of the pressure of the working fluid in the working stroke chamber 113, owing to the working fluid being compressed by the moving piston 112, whereby the inlet passages 128 become open. The pressure in the working stroke chamber 113 (FIG. 12) increases, while the working fluid escapes from the idle stroke chamber 114 into the ambient atmosphere. The piston 112 is first halted, and then is driven through a working stroke. At the initial moment of the opening of the exhaust port 115 by the piston 112, the flow rate of the working fluid through the inlet passages 128 attains a critical value, and the ensuing slight further motion of the piston 112 results in the pressure differential acting upon the portions of the resilient value element 127, opposing the inlets 124 (FIG. 13), abruptly increasing. The portions of the resilient valve element 127 are deformed and pressed against the inlets 124. At the same instant the portions of the resilient valve element 127, which have been pressed against the inlets 125, clear these inlets 125 by the action of the inherent resilience of the material of the element 127 and of the pressure of the working fluid in the idle stroke chamber 114. The pressure in the idle stroke chamber 114 increases, while the working fluid is withdrawn from the working stroke chamber 113 through the exhaust port 115. Upon having delivered an impact upon the work-performing member 118, the piston 112 is driven through an idle stroke. Then the piston 112 is repeatedly driven through cycles similar to the abovedescribed one.

The last-described construction of the percussion mechanism enables utilization of the resilience of the resilient valve element 127 to establish a feedback connection between the feed of the pressurized working fluid into the working stroke chamber 113 and the feed of said fluid into the idle stroke chamber 114. This enhances the reliability of the performance of the valve and provides for timely discontinuation of the supply of the working fluid into these chambers.

What we claim is:

1. A percussion mechanism particularly suitable for a hand-operated percussion tool actuated by a pressurized fluid supplied from a source of pressurized fluid, comprising a housing (81) with an internal cylindrical space and exhaust ports (87,88);

a fluid actuated piston (84), having a head (91), a tail (92) and a blind bore (93) and being positioned for axial reciprocation in said space of said housing and dividing said space into a working stroke chamber (85) of a variable volume and an idle stroke chamber (86) of a variable volume, and each of said chambers communicating with one of said exhaust ports;

a fluid distributing means (82) having a central bore (97) and being cooperatively associated with pressure responsive surfaces (103) of a resilient valve element for defining inlet passages (104) for the admission of fluid to the working stroke chamber (85) of the mechanism;

a closure (83) having inlet means for said housing (81) defining with said fluid distributing means (82) a supply space (92) for receiving said pressurized fluid from a said source;

the tail of said fluid actuated piston being received in said central bore of said fluid distributing means, and passages (94, 99), respectively, located in said tail and said fluid distributing means for directing said pressurized fluid from said supply space to said blind bore (93);

said fluid distributing means having radial bores (102) and passageways (100), said passageways (100) connecting said working stroke chamber (85) with said central bore (97), and the passageways (100) and the radial bores (102) connecting the working stroke chamber (85) to the inlet passages (104);

a work performing member (90) accommodated in said housing (81) to receive impacts from said piston (84) reciprocated by the action of the fluid;

said pressure responsive surfaces (103) of said resilient valve element being disposed about said fluid distributing means (82); valve seats provided in a surface of said fluid distributing means, their number equalling to the number of radial bores (102) of said fluid distributing means;

said resilient valve element (103) being stretched tight about the surface of said fluid distributing means (82) in opposition to said radial bores (102) and encircling said fluid distributing means for a portion of its periphery, the internal surfaces of said resilient valve element (103) with the valve seats defining said inlet passages (104) for controlling fluid flow about said fluid distributing means (82), whereby said piston is repeatedly up and down in said housing by the action of said fluid flowing into and out of said chambers and said exhaust ports via said inlet means and said radial bores.

2. The percussion mechanism according to claim 1, wherein the remaining portion of the periphery of said fluid distributing means which does not contain said resilient valve element is disposed in opposition to said inlet means of said closure.

3. The percussion mechanism according to claim 1, wherein said resilient valve element is in the form of an open ring and the ends thereof are secured to said fluid distributing means.

4. The percussion mechanism according to claim 3, wherein said ends of said resilient valve element are provided with plugs pinned in corresponding holes in said fluid distributing means.

5. The percussion mechanism according to claim 3, wherein said ends of said resilient valve element are provided with lugs which are received in corresponding grooves provided in said fluid distributing means.

6. The percussion mechanism according to claim 1, wherein an external surface of said resilient valve element, in the areas opposing said inlet passages in said fluid distributing means, has thickened portions to protect said resilient valve element.

* * * * *